United States Patent
Yamamoto (10) Patent No.: US 7,460,184 B2
(45) Date of Patent: Dec. 2, 2008

(54) DIGITAL TELEVISION BROADCAST SIGNAL RECEIVER

(75) Inventor: Naoki Yamamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 769 days.

(21) Appl. No.: 11/116,396

(22) Filed: Apr. 28, 2005

(65) Prior Publication Data

US 2005/0257237 A1    Nov. 17, 2005

(30) Foreign Application Priority Data

Apr. 28, 2004   (JP)   ............... 2004-132341

(51) Int. Cl.
*H04N 7/20* (2006.01)
*H04N 5/50* (2006.01)
*H04N 5/46* (2006.01)

(52) U.S. Cl. ............. 348/725; 348/570; 348/731; 725/72

(58) Field of Classification Search .......... 348/570, 348/725, 180, 192, 731, 732; 725/72; 455/161.3, 455/184.1, 185.1, 186.1, 226.1–226.4, 277.2; 342/371, 372; 343/735, 818, 838
See application file for complete search history.

(56) References Cited

U.S. PATENT DOCUMENTS

| | | | |
|---|---|---|---|
| 6,400,320 B1 * | 6/2002 | Stilp et al. ............. | 342/457 |
| 6,996,075 B2 * | 2/2006 | Santhoff et al. ......... | 370/310 |
| 2003/0016174 A1 * | 1/2003 | Anderson ............... | 342/378 |
| 2003/0162546 A1 * | 8/2003 | Jordan .................... | 455/446 |
| 2004/0248517 A1 * | 12/2004 | Reichgott et al. ....... | 455/63.4 |
| 2006/0012476 A1 * | 1/2006 | Markhovsky et al. .. | 340/539.32 |

FOREIGN PATENT DOCUMENTS

| | | |
|---|---|---|
| JP | 2002-076742 | 3/2002 |
| JP | 2003-60423 | 2/2003 |
| JP | 2003-224502 | 8/2003 |

* cited by examiner

*Primary Examiner*—Victor R Kostak
(74) *Attorney, Agent, or Firm*—Crowell & Moring LLP (57) ABSTRACT

In a digital TV broadcast signal receiver connected to a multi-directional antenna called smart antenna, when a TV broadcast signal of an optional channel becomes unreceivable for any reason, it makes possible to restart displaying an image on a screen of a monitor display device, quickly. The digital TV broadcast signal receiver previously sets a plurality of optimum signal receiving direction with respect to each receivable channel with an order of priority, and switches an effective signal receiving direction of a multi-directional antenna connected thereto to one of the optimum signal receiving directions of a channel chosen by a user corresponding to the order of priority, when the TV broadcast signal of the channel is unreceivable.

5 Claims, 5 Drawing Sheets

DIGITAL TELEVISION BROADCAST SIGNAL RECEIVER

BACKGROUND OF THE INVENTION

1. Field of the Invention

The present invention relates to a digital television (TV) broadcast signal receiver that can receive digital television broadcast signals such as ATSC (Advanced television systems Committee).

2. Description of the Related Art

In the North American Continent where an ATSC digital television broadcast (it is abbreviated to a hereinafter digital TV broadcast) is performed, plains are dotted with metropolises, so that various digital TV broadcast signals broadcasted in the suburbs of each metropolis can be received at other cities or the halfway point of the cities. In consideration from a user who receives the TV broadcast signals, since many TV broadcast signals are transmitted in various directions, it is necessary to regulate a direction of an antenna in an orientation to a TV broadcasting station from which a program which he wants to watch is delivered. Therefore, a multi-directional antenna such as a smart antenna is put into practical use.

With respect to an apparatus connected to a multi-directional antenna such as a smart antenna, there are prior arts of Japanese Laid-Open Patent Publications No. 2003-224502, 2003-60423 and 2002-76742.

According to the EIA-909 technical standard, it is provided that a smart antenna has sixteen signal receiving directions in respective directions where a circle is divided into sixteen. A digital TV broadcast signal receiver in compliance with the EIA-909 technical standard can adjust an effective signal receiving direction of the multi-directional antenna such as the smart antenna in all sixteen signal receiving directions. Generally, in the digital TV broadcast signal receiver, TV broadcast signal are previously received in each of sixteen signal receiving direction of a multi-directional antenna with respect to each of normally receivable channel, an intensity of each received TV broadcast signal is measured, and a direction showing the largest value of the sensitivity is defined as an optimum signal receiving direction of each channel.

In general, an antenna of a TV station, that is, a position of a TV tower is invariance. Thus, the optimum signal receiving direction of each channel is once decided, it is no need to reset the optimum signal receiving direction. For example, in the United States, a TV station can be established relatively easier. In contrast, a TV station suddenly becomes bankrupt. Therefore, it happens that a new channel, which cannot be received beforetime, can be received, or an old channel receivable long before cannot be received. Furthermore, a signal receiving condition of a TV broadcast signal of a channel is varied due to construction of a high-rise building. Thus, a TV broadcast signal cannot be received normally suddenly in a direction, in which the TV broadcast signal was normally received. In such a case, it wastes time in searching of an optimum signal receiving direction of each receivable channel in all sixteen signal receiving directions, similar to when a multi-directional antenna is newly connected to the digital TV broadcast signal receiver, and it causes the irritation of a user.

SUMMARY OF THE INVENTION

A purpose of the present invention is to provide a digital TV broadcast signal receiver connected to a multi-directional antenna, in which a plurality of signal receiving directions is set with an order of priority as optimum signal receiving directions with respect to each channel normally receivable, and continues to receive the TV broadcast signal of the same channel by serially switching an effective signal receiving direction of a multi-directional antenna to previously set signal receiving directions having lower priority.

A digital TV broadcast signal receiver in accordance with an aspect of the present invention connected to a multi-directional antenna having a plurality of signal receiving directions in compliance with a predetermined technical standard and receives a digital television broadcast signal by making an effective signal receiving direction among a plurality of signal receiving directions effective.

The digital TV broadcast signal receiver comprises a tuner for receiving digital television broadcast signal through the multi-directional antenna, and a controller for switching effective signal receiving direction of the multi-directional antenna. And the controller previously sets a plurality of optimum signal receiving directions of each receivable channel with an order of priority, if possible.

When a television broadcast signal of an optional channel becomes unreceivable in an optimum signal receiving direction of the optional channel, the controller switches the effective signal receiving direction of the multi-directional antenna to another optimum signal receiving direction of the optional channel corresponding to the order of priority.

By such a configuration, it is possible to restart displaying an image on a screen of a monitor display device, quickly, when the TV broadcast signal of the optional channel becomes unreceivable for any reason.

It is possible that the controller measures a sensitivity of television broadcast signal of each channel, compares a value of measured sensitivity with a predetermined threshold value, and decides the channel normally receivable when the value of measured sensitivity is equal to or larger than the threshold value.

Furthermore, it is possible that the controller further compares the values of measured sensitivities equal to or larger than the threshold value with each other with respect to each channel, and decides a plurality of signal receiving directions showing a plurality of the values in descending order as the optimum signal receiving directions of the optional channel, when there is a plurality of the values of measured sensitivities equal to or larger than the threshold value.

When a user chooses an optional channel, it is possible that the controller switches the effective signal receiving direction of the multi-directional antenna to one of the optimum signal receiving direction of the optional channel, the tuner receives a television broadcast signal of the optional channel, and the controller judges whether the television broadcast signal of the optional channel is normally receivable in the optimum signal receiving direction or not with using the television broadcast signal received through the tuner.

When the television broadcast signal of the optional channel is normally receivable, the controller continues to receive the television broadcast signal of the optional channel in the same signal receiving direction with no action. And when the television broadcast signal of the optional channel cannot be received normally, the controller switches the effective signal receiving direction of the multi-directional antenna to another optimum signal receiving direction of the optional channel.

DETAILED DESCRIPTION OF THE EMBODIMENT

Figure 1:
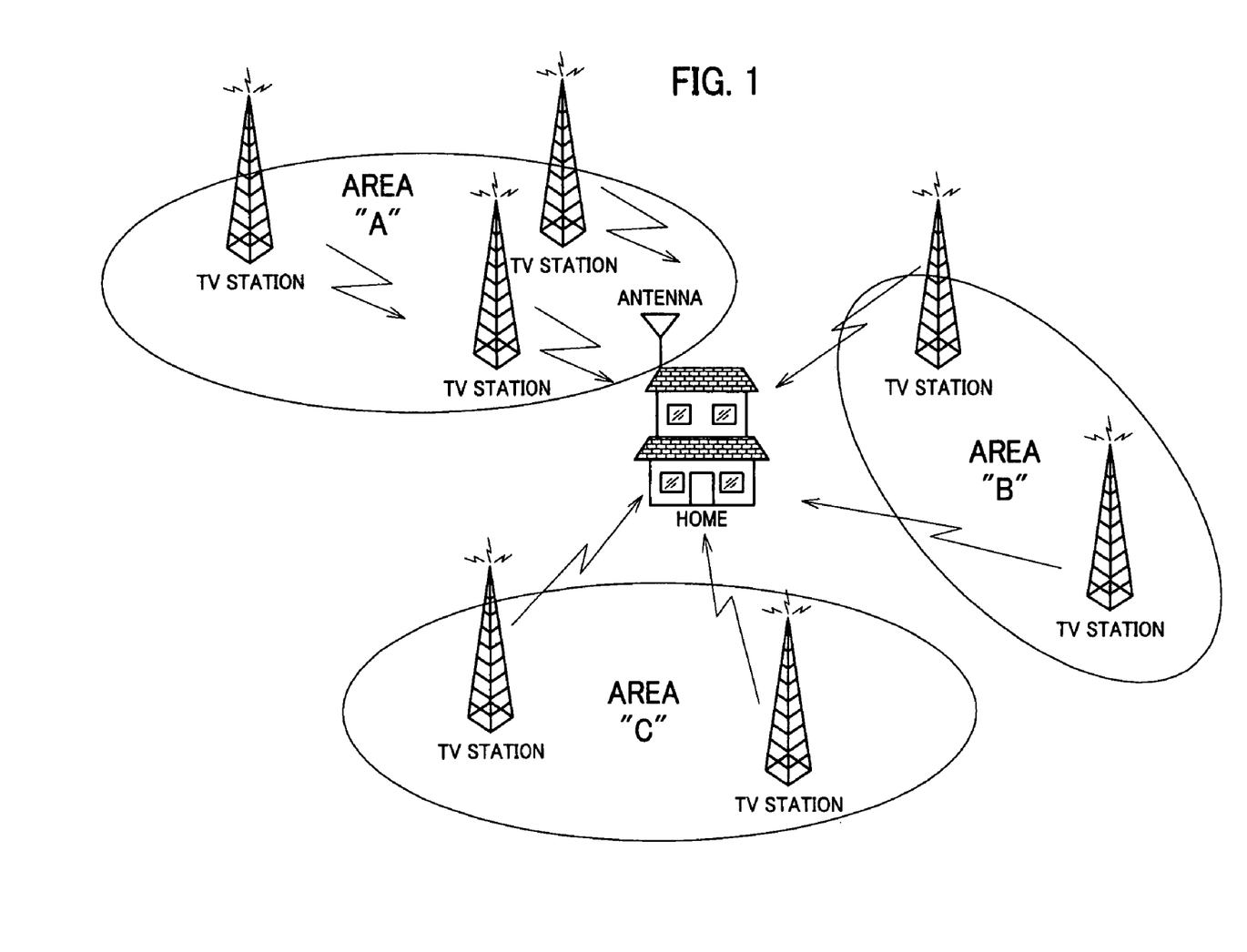
FIG. 1 is a conceptual diagram showing a circumstance for receiving digital television (TV) broadcast signals in home.

A digital TV broadcast signal receiver in accordance with an embodiment of the present invention is described with reference to figures. A circumstance for receiving TV broadcast signals in home is shown in FIG. 1. In an area where grand-based digital TV broadcast is performed, when a sensitivity of received signal of a digital TV broadcast signal is equal to or larger than a predetermined threshold value, an image having a predetermined image quality can be obtained by correction. Thus, it is possible to view TV programs by receiving TV broadcast signals which are delivered from TV stations existing at many positions in such as areas designated by symbols A, B, C, and so on, as shown in FIG. 1. According to such a circumstance, various types of multi-directional antennas called smart antenna having a plurality of signal receiving directions are put into practical use.

As a configuration of the multi-directional antenna, there are many types, for example, for rotating an antenna with a motor for changing the effective signal receiving direction, or having a plurality of signal receiving directions (sub-antennas) and electronic switches and selecting an effective signal receiving direction by switching on and off of the electronic switches. According to the EIA-909 technical standard, it is provided that the multi-directional antenna has sixteen signal receiving directions. A digital TV broadcast signal receiver for receiving digital TV broadcast signals in compliance with the EIA-909 technical standard can switch all of sixteen signal receiving directions with no relation to kind or specification of the multi-directional antenna connected thereto.

In the conventional digital TV broadcast signal receiver, when the effective signal receiving direction of the multi-directional antenna is switched, a direction showing the largest value of the sensitivity of received TV broadcast signal is generally selected as the optimum signal receiving direction with respect to each channel. However, in the digital TV broadcast, when the sensitivity of received digital TV broadcast signal is equal to or larger than a predetermined threshold value, an image having a predetermined picture quality can be obtained. Thus, it is possible to receive a TV broadcast signal in a signal receiving direction, which does not necessarily show the largest value of the sensitivity of the TV broadcast signal, and to display an image on a screen of a monitor display apparatus. In the following description, a fact that a value of a sensitivity of a TV broadcast signal is equal to or larger than a predetermined threshold value is defined as "TV broadcast signal is normally receivable".

A digital TV broadcast signal receiver in accordance with this embodiment previously sets a primary optimum signal receiving direction, a second optimum signal receiving direction and a third optimum signal receiving direction, if possible, with an order of priority, when there is a plurality of signal receiving directions of a multi-directional antenna, in which a TV broadcast signal of each channel can be received normally. When the TV broadcast signal of a channel cannot be received normally in the primary optimum signal receiving direction, the effective signal receiving direction of the multi-directional antenna is switched to the second optimum signal receiving direction or the third optimum signal receiving direction so as to continue the receiving of the TV broadcast signal of the channel, normally.

Figure 2:
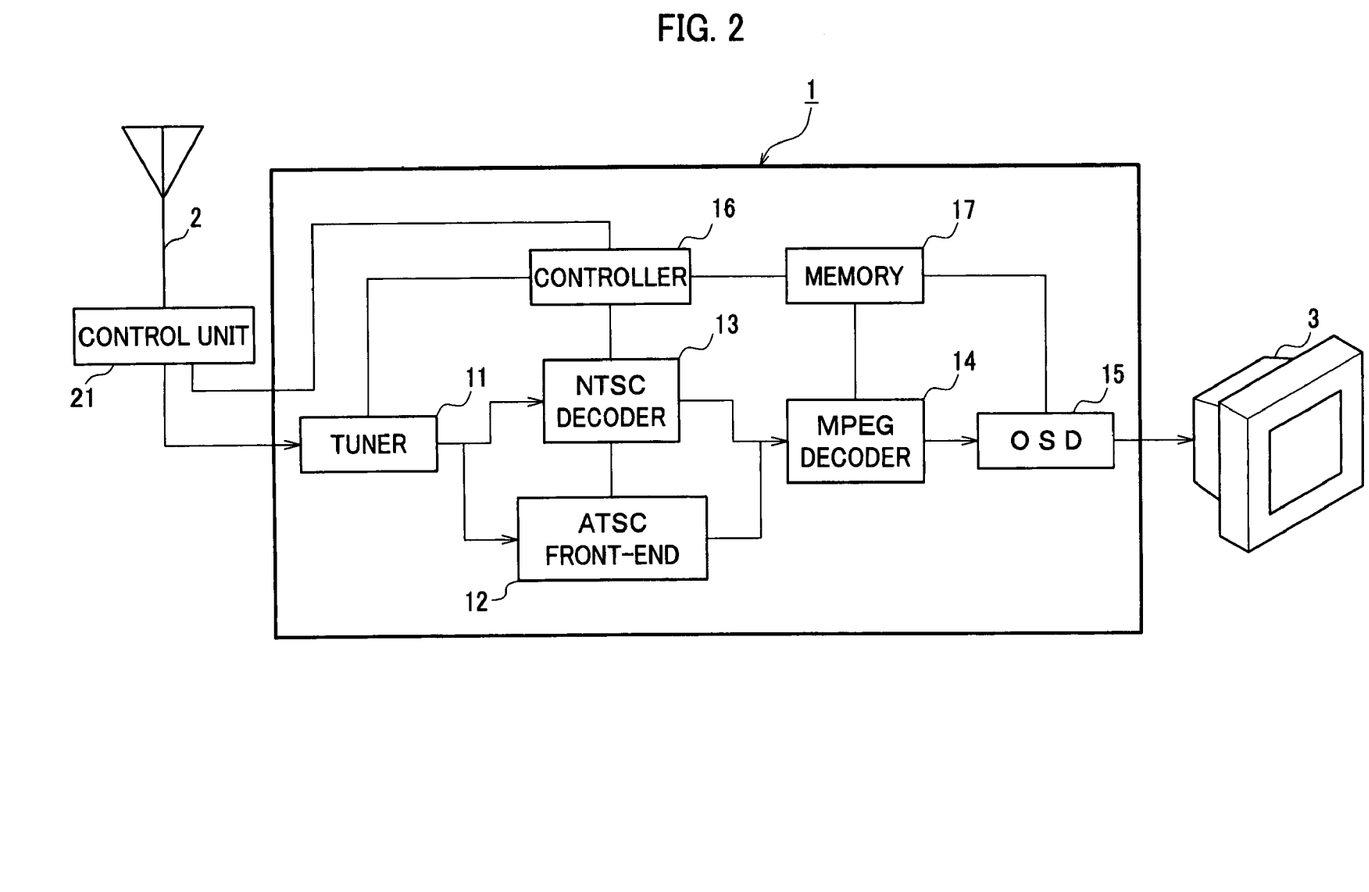
FIG. 2 is a block diagram showing a configuration of a digital TV broadcast signal receiver in accordance with an embodiment of the present invention.

Subsequently, a configuration of the digital TV broadcast signal receiver 1 in accordance with this embodiment is shown in FIG. 2. The digital TV broadcast signal receiver 1 comprises a tuner 11 serving as a TV signal receiving means which is connected to a multi-directional antenna 2, an ATSC front-end 12 serving as a digital signal processing means for processing predetermined signal processing to digital TV broadcast signals received by the tuner 11, and decoding the processed signals, an NTSC decoder 13 for decoding analogue TV broadcast signals received by the tuner 11, an MPEG decoder 14 serving as signal output means for decoding MPEG compressed TV broadcast signals, an on screen display unit (OSD) 15 for superimposing a predetermined display image onto the decoded TV broadcast signals, a controller (CPU) 16 serving as entire control means for sensing signal receiving condition of the TV broadcast signals received by the tuner 11, for controlling a control unit 21 of the multi-directional antenna 2 (serving as a signal receiving direction deciding means and a control signal output means), and for controlling the ATSC front-end 12, the NTSC decoder 13, and so on, and a memory 17 serving an memory means for temporarily memorizing the decoded TV broadcast signals and for memorizing the display image to be superimposed on the decoded TV broadcast signals. The decoded TV broadcast signals decoded by the MPEG decoder 14 is outputted to a monitor display apparatus 3 through the on screen display unit 15, so that the image is displayed on the screen of the monitor display apparatus 3.

In the digital TV broadcast, data can be transmitted from the digital TV broadcast signal receiver 1 at user side to the TV station. It, however, is nothing to the present invention directly, so that the description of it is omitted.

The control unit 21 of the multi-directional antenna 2 makes only one signal receiving direction among a plurality of the signal receiving directions, which is chosen by the controller 16, effective, corresponding to the control signal outputted from the controller 16. When the multi-directional antenna 2 rotates an antenna with a motor in order to change the effective signal receiving direction, the control unit 21 controls the motor to orientating the antenna corresponding to the direction selected by the controller 16. Alternatively, when the multi-directional antenna 2 switches on and off of electronic switches in order to switch the effective signal receiving direction, the control unit 21 switches on only one electronic switch corresponding to the direction selected by the controller 16 and off the other electronic switches.

Subsequently, selection of the primary optimum signal receiving direction, second optimum signal receiving direction and third optimum signal receiving direction of the multi-directional antenna 2 with respect to each receivable channel through the controller 16 of the digital TV signal receiver 1 is described with reference to a flowchart shown in FIG. 3.

When the controller 16 senses that the multi-directional antenna 2 is connected to the tuner 11, the controller 16 performs an initial processing for setting the primary optimum signal receiving direction, second optimum signal receiving direction and third optimum signal receiving direction of the multi-directional antenna 2 with respect to each channel which is receivable through the multi-directional antenna 2. The controller 16 sets a numeric value n=16 in a direction counter (S1), and outputs a control signal for selecting the n-th direction among a plurality of the signal receiving direction of the multi-directional antenna 2 (S2). After outputting the control signal to the control unit 21 of the multi-directional antenna 2, the controller 16 further sets, for example, a numeric value m=12 in a channel counter (S3). After passing a term necessary for switching the effective signal receiving direction of the multi-directional antenna 2, the TV broadcast signal of the m-th channel is received through the tuner 11 (S4). When the TV broadcast signal of the m-th channel is received, the controller 16 measures sensitivity of received TV broadcast signal of the m-the channel, and memorizes a measurement data of sensitivity into the memory 17 (S5). Subsequently, the controller 16 subtracts a value one from the numeric value of the channel counter (S6), and judges whether the measurement of the sensitivity of the digital TV broadcast signals with respect to all of the twelve channels has been completed or not (S7). When the measurement of the sensitivity of the TV broadcast signals with respect to all of the twelve channels has not been completed, the controller 16 returns to the step S3 and measures the sensitivity of the digital TV broadcast signal with respect to next channel ((m-1)-th channel). Alternatively, when the measurement of the sensitivity of the TV broadcast signals with respect to all of the twelve channels has been completed (YES in S7), the controller 16 subtracts a value one from the numeric value of the direction counter (S8), and judges whether the measurement of the sensitivities of the digital TV broadcast signals with respect to each channel in all of sixteen signal receiving directions has been completed or not (S9). When the measurement of the sensitivities of the digital TV broadcast signals with respect to all the receivable channels in all of sixteen signal receiving directions has not been completed, the controller 16 returns to the step S2, and measures the sensitivities of the digital TV broadcast signals with respect to all the receivable channels in next signal receiving direction ((n-1)-th direction).

When the measurement of the sensitivities of the digital TV broadcast signals with respect to all the receivable twelve channels in all the sixteen signal receiving directions has been completed (YES in S9), the controller 16 reads out the measured data of sensitivities memorized in the memory 17 and compares all the measured values of the sensitivities with a predetermined threshold value (S10). Then, the controller 16 extracts signal receiving directions in which data of sensitivities equal to or larger than a predetermined threshold value are obtained (S11), and decides a primary optimum signal receiving direction, a second optimum signal receiving direction and a third optimum signal receiving direction, if possible, of each channel (S12).

Figure 4:
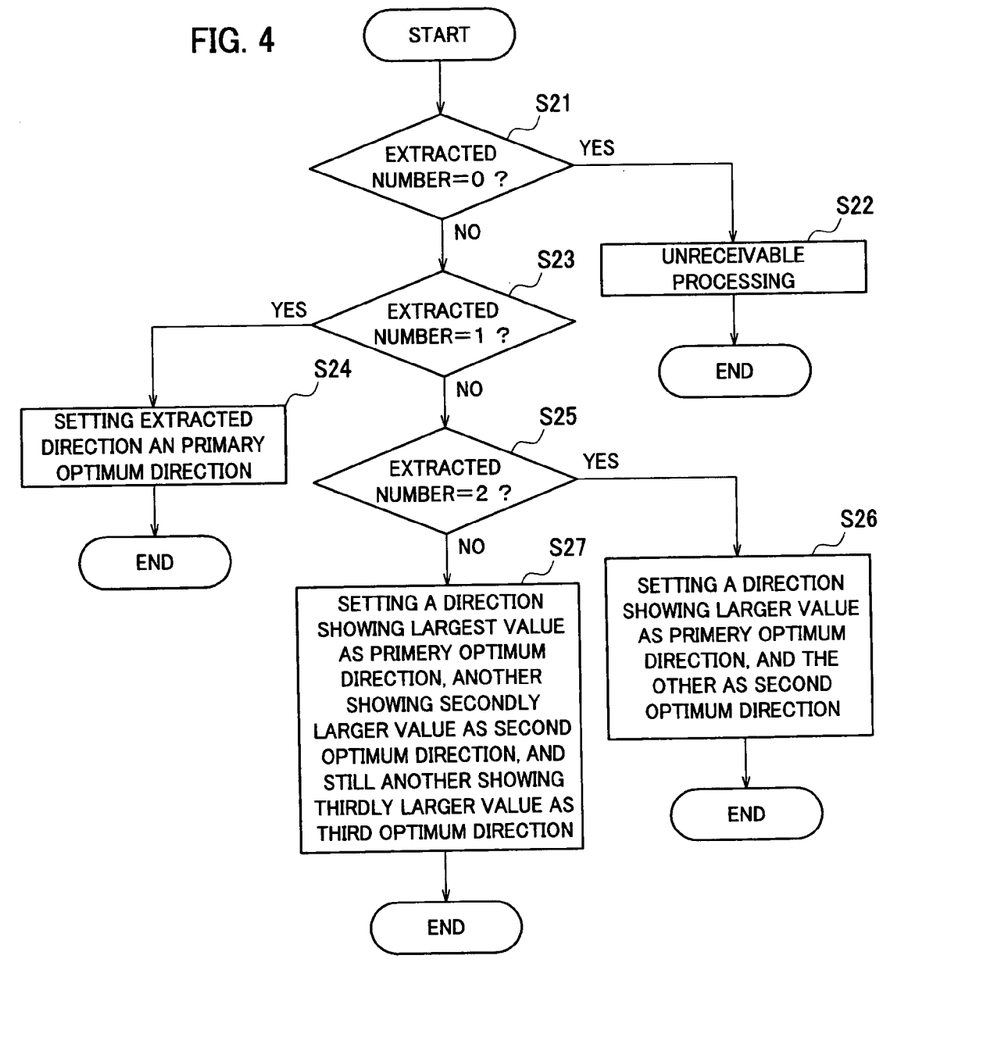
FIG. 4 is a flowchart showing a process for deciding a primary, a second and a third optimum signal receiving directions each channel in a step S12 of the flow shown in FIG. 3.

Subsequently, setting process of the primary optimum signal receiving direction, second optimum signal receiving direction and third optimum signal receiving direction of each channel in the step S12 is described with reference to a flowchart shown in FIG. 4. The controller 16 searches a number of signal receiving directions extracted in the step S11, in which a TV broadcast signal of an optional channel can be received normally (S21, S23 and S25). When the number of signal receiving directions is zero, that is, the TV broadcast signal cannot be received normally in any signal receiving direction (YES in S21), the controller 16 performs a signal unreceivable processing, for example, displaying a message of unreceivable on the screen of the monitor display apparatus 3 (S22). When the number of signal receiving directions is one, that is, the TV broadcast signal can be received normally only in one signal receiving direction (YES in S23), the controller 16 sets the extracted signal receiving direction as the primary optimum signal receiving direction of the channel (S24). At that time, no signal receiving direction is set as the second optimum signal receiving direction and the third optimum signal receiving direction. When the number of signal receiving directions is two, that is, the TV broadcast signal can be received normally in two signal receiving directions (YES in S25), the controller 16 sets an extracted signal receiving direction showing a larger value of the sensitivity of the TV broadcast signal as the primary optimum signal receiving direction of the channel, and the other extracted signal receiving direction as the second optimum signal receiving direction of the channel (S26). At that time, no signal receiving direction is set as the third optimum signal receiving direction. When the number of signal receiving directions is equal to or larger than three (NO in S25), the controller 16 sets an extracted signal receiving direction showing the largest value of the sensitivity of the TV broadcast signal as the primary optimum signal receiving direction of the channel, another extracted signal receiving direction showing a secondly larger value of the sensitivity of the TV broadcast signal as the second optimum signal receiving direction of the channel, and still another extracted signal receiving direction showing a thirdly larger value of the sensitivity of the TV broadcast signal as the third optimum signal receiving direction of the channel (S27).

An example of the sensitivity of the digital TV broadcast signal of each channel in each signal receiving direction described in the above-mentioned steps S10 to S12 and S21 to S27 is shown in the table 1.

TABLE 1

| DIRECTION | 2ch | 4ch | 6ch | 8ch | 10ch | 12ch |
|---|---|---|---|---|---|---|
| 1 | 40% | 10% | 10% | 80% | 100% | 10% |
| 2 | 50% | 10% | 10% | 70% | 60% | 10% |
| 3 | 80% | 10% | 20% | 50% | 50% | 20% |
| 4 | 50% | 10% | 40% | 40% | 40% | 10% |
| 5 | 40% | 20% | 60% | 30% | 10% | 10% |
| 6 | 20% | 10% | 70% | 30% | 10% | 10% |
| 7 | 10% | 10% | 50% | 40% | 10% | 10% |
| 8 | 10% | 10% | 40% | 60% | 20% | 10% |
| 9 | 10% | 10% | 20% | 40% | 40% | 40% |
| 10 | 20% | 10% | 10% | 30% | 20% | 60% |
| 11 | 30% | 10% | 20% | 30% | 10% | 70% |
| 12 | 10% | 40% | 30% | 40% | 10% | 60% |
| 13 | 20% | 60% | 20% | 50% | 10% | 40% |
| 14 | 10% | 40% | 10% | 70% | 40% | 20% |
| 15 | 10% | 10% | 10% | 90% | 50% | 10% |
| 16 | 20% | 10% | 10% | 100% | 70% | 0% |

In the table 1, it is assumed that the threshold value is set to be 40%, and the channel showing the sensitivity equal to or larger than 40% is normally receivable. For example, attending to the sixth channel (6ch), the TV broadcast signal can be received normally in five signal receiving directions of fourth, fifth, sixth, seventh and eighths directions designated by numerals 4, 5, 6, 7 and 8. Among these signal receiving directions, the sixth signal receiving direction shows the largest value of the sensitivity of the TV broadcast signal, the fifth signal receiving direction shows a secondly larger value of the sensitivity of the TV broadcast signal, and the seventh signal receiving direction shows a thirdly larger value of the sensitivity of the TV broadcast signal. Thus, the sixth signal receiving direction is set to be the primary optimum signal receiving direction, the fifth signal receiving direction is set to be the second optimum signal receiving direction and the seventh signal receiving direction is set to be the third optimum signal receiving direction, with respect to the sixth channel. The same goes for another channel.

Figure 5:
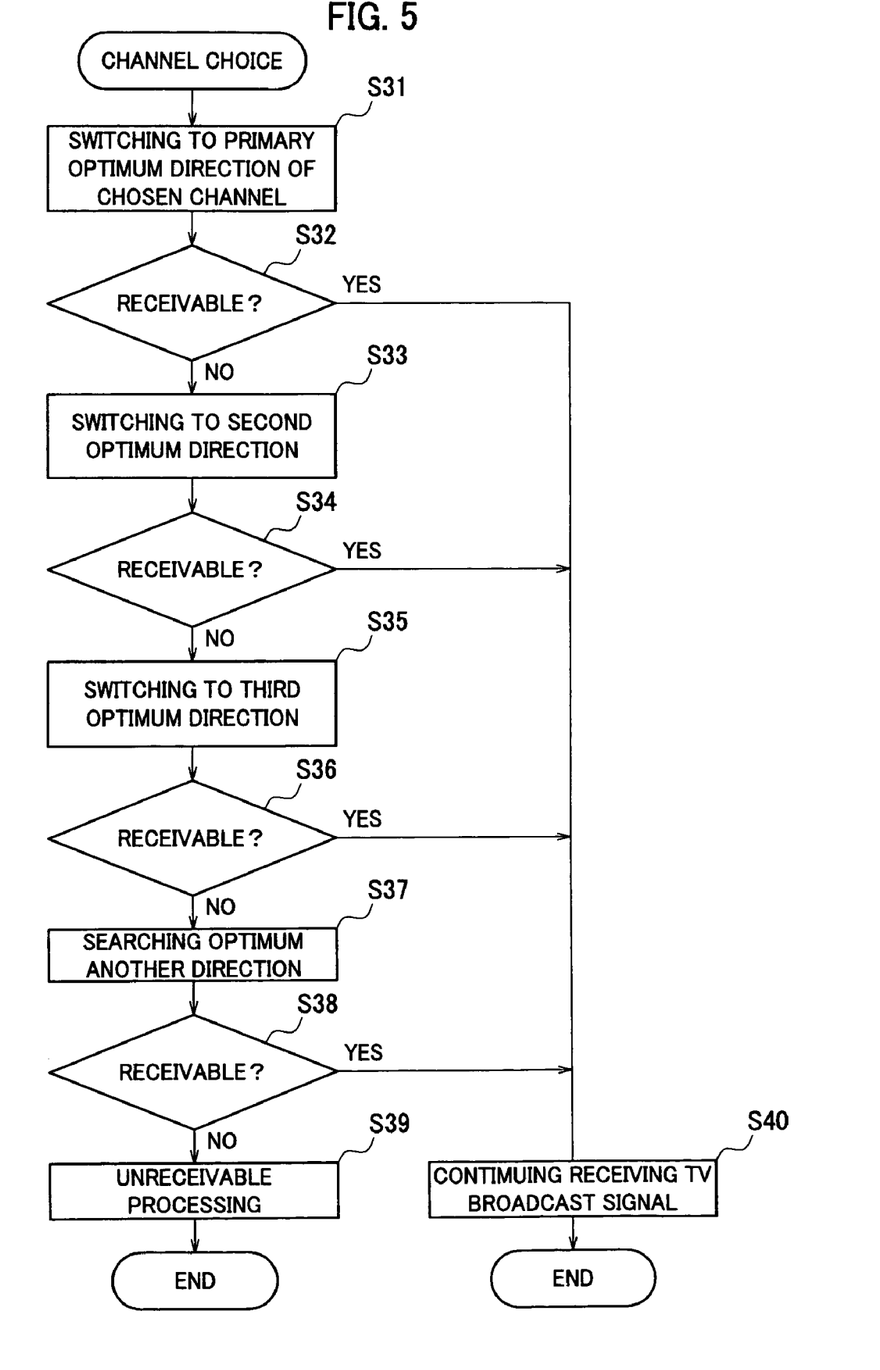
FIG. 5 is a flowchart showing a process for switching an effective signal receiving direction of a multi-directional antenna when a plurality of optimum signal receiving directions are set with respect to an optional channel with an order of priority.

Subsequently, a signal receiving direction switching operation of the digital TV broadcast signal receiver 1 when a user chooses a channel is described with reference to a flowchart shown in FIG. 5. When the user chooses an optional channel, the controller 16 reads out the primary optimum signal receiving direction of the channel from the memory 17, and outputs a control signal to the control unit 21 of the multi-directional antenna 2 so as to set the effective signal receiving direction of the multi-directional antenna 2 to the primary optimum signal receiving direction of the channel (S31). Subsequently, the controller 16 judges whether a value of a sensitivity of a TV broadcast signal received through the tuner 11 is equal to or larger than a predetermined threshold value, that is, the TV broadcast signal is normally receivable or not (S32). When the TV broadcast signal is normally receivable (YES in S32), the controller 16 continues to receive the TV broadcast signal with no action (S40).

Alternatively, when the TV broadcast signal cannot be received normally (NO in S32), the controller 16 reads out the second optimum signal receiving direction of the channel from the memory 17, switches the effective signal receiving direction of the multi-directional antenna 2 to the second optimum signal receiving direction of the channel (S33), and judges whether the TV broadcast signal of the channel is normally receivable or not (S34). When the TV broadcast signal is normally receivable (YES in S34), the controller 16 continues to receive the TV broadcast signal with no action (S40). Alternatively, when the TV broadcast signal cannot be received normally (NO in S34), the controller 16 reads out the third optimum signal receiving direction of the channel from the memory 17, switches the effective signal receiving direction of the multi-directional antenna 2 to the third optimum signal receiving direction of the channel (S33), and judges whether the TV broadcast signal of the channel is normally receivable or not (S36). When the TV broadcast signal is normally receivable (YES in S36), the controller 16 continues to receive the TV broadcast signal with no action (S40).

Figure 3:
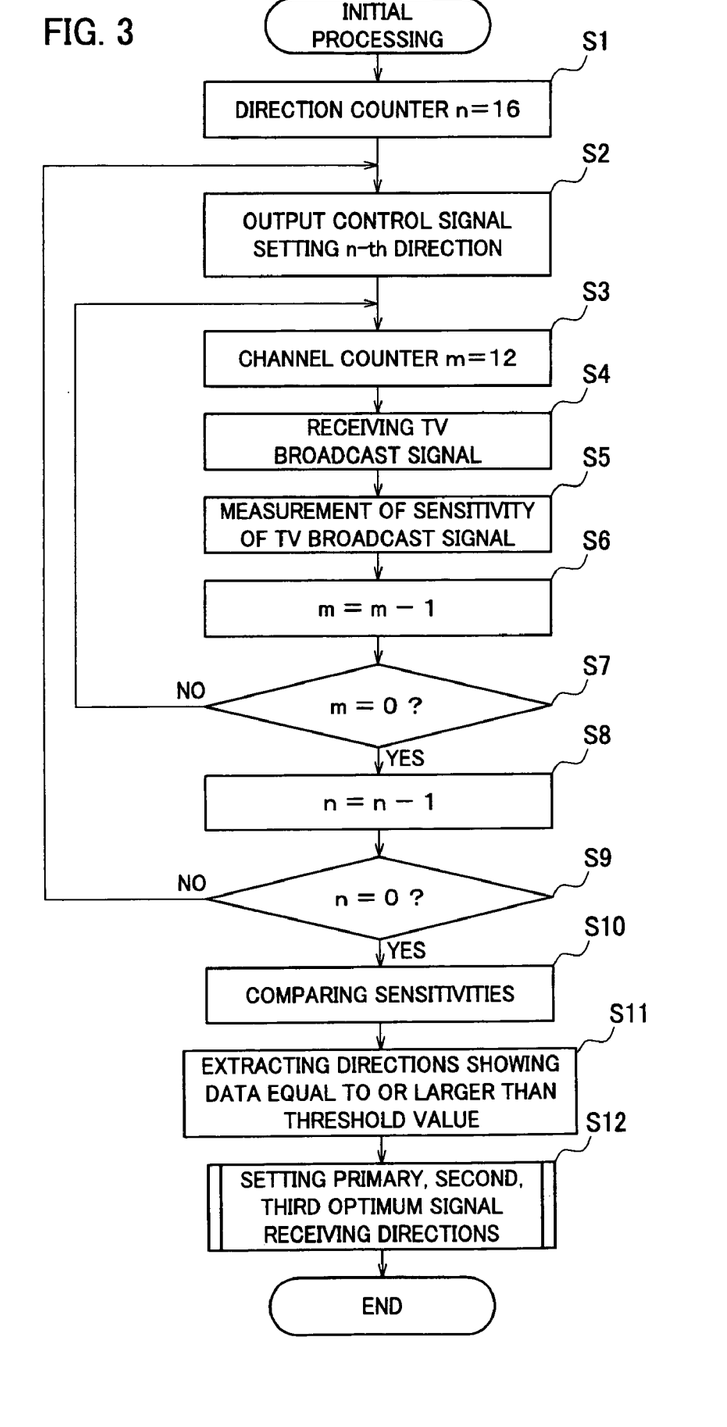
FIG. 3 is a flowchart showing a process for deciding at least one optimum signal receiving direction each channel in the digital TV broadcast signal receiver.

When the TV broadcast signal cannot normally receivable in any of primary, second and third optimum signal receiving directions (NO in S36), the controller 16 performs the flow shown in FIG. 3 for searching optimum signal receiving directions of the channel (S37). When the TV broadcast signal of the channel is normally receivable in one of searched optimum signal receiving directions (YES in S38), the controller 16 continues to receive the TV broadcast signal with no action (S40). Alternatively, when the TV broadcast signal of the channel cannot be received normally in any of the searched optimum signal receiving directions (NO in S38), it is considered that the TV broadcast signal of the channel is unreceivable for any reason, so that the controller 16 performs the signal unreceivable processing (S39).

The present invention, however, is not limited to the above-mentioned embodiment. It is sufficient that a digital TV broadcast signal receiver previously sets a plurality of optimum signal receiving directions with respect to each receivable channel with an order of priority, and switches an effective signal receiving direction of a multi-directional antenna connected thereto to one of the optimum signal receiving directions of a channel chosen by a user corresponding to the order of priority, when the TV broadcast signal of the channel is unreceivable. Thus, it is possible to restart of receiving the TV broadcast signal of the channel, when the TV broadcast signal of the channel becomes unreceivable normally in any optimum signal receiving direction.

A number of the optimum signal receiving directions of each channel is not limited to the above-mentioned three directions. It is sufficient that the digital TV broadcast signal receiver sets at least two, for example, two, four or more optimum signal receiving directions to each channel.

This application is based on Japanese patent application 2004-132341 filed Apr. 28, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital television broadcast signal receiver connected to a multi-directional antenna having a plurality of signal receiving directions in compliance with a predetermined technical standard, receiving a digital television broadcast signal by making only one signal receiving direction among a plurality of signal receiving directions effective, comprising:
    a tuner for receiving digital television broadcast signal through the multi-directional antenna; and a controller for switching effective signal receiving direction of the multi-directional antenna; wherein
    the controller previously sets a plurality of optimum signal receiving directions of each receivable channel with an order of priority, if possible;
    when a television broadcast signal of an optional channel becomes unreceivable in an optimum signal receiving direction of the optional channel, the controller switches the effective signal receiving direction of the multi-directional antenna to another optimum signal receiving direction of the optional channel corresponding to the order of priority.

2. The digital television broadcast signal receiver in accordance with claim 1, wherein
    the controller measures a sensitivity of television broadcast signal of each channel, compares a value of measured sensitivity with a predetermined threshold value, and decides the channel normally receivable when the value of measured sensitivity is equal to or larger than the threshold value.

3. The digital television broadcast signal receiver in accordance with claim 2, wherein
    the controller further compares the values of measured sensitivities equal to or larger than the threshold value with each other with respect to each channel, and decides a plurality of signal receiving directions showing a plurality of the values in descending order as the optimum signal receiving directions of the optional channel, when there is a plurality of the values of measured sensitivities equal to or larger than the threshold value.

4. The digital television broadcast signal receiver in accordance with claim 1, wherein
    when a user chooses an optional channel, the controller switches the effective signal receiving direction of the multi-directional antenna to one of the optimum signal receiving direction of the optional channel, and the tuner receives a television broadcast signal of the optional channel;

the controller judges whether the television broadcast signal of the optional channel is normally receivable in the optimum signal receiving direction or not with using the television broadcast signal received through the tuner;

when the television broadcast signal of the optional channel is normally receivable, the controller continues to receive the television broadcast signal of the optional channel in the same signal receiving direction with no action; and when the television broadcast signal of the optional channel cannot be received normally, the controller switches the effective signal receiving direction of the multi-directional antenna to another optimum signal receiving direction of the optional channel.

5. A digital television broadcast signal receiver, to which a multi-directional antenna having a plurality of signal receiving directions in compliance with a predetermined technical standard, receiving a digital television broadcast signal by making only one signal receiving direction among a plurality of signal receiving directions effective, comprising:

a control signal output means for outputting a control signal for switching an effective signal receiving direction to the multi-directional antenna so as to receive a television broadcast signal;

a television broadcast signal receiving means connected to the multi-directional antenna for receiving a digital television broadcast signal;

a digital signal processing means for performing a predetermined signal processing to the digital television broadcast signal received by the television broadcast signal receiving means;

a signal output means for outputting a signal processed by the digital signal processing means to a monitor display apparatus;

a memory means for temporarily memorizing data processed by the digital signal processing means;

a signal receiving direction deciding means for deciding at least one optimum signal receiving direction with respect to each receivable channel with using the data memorized in the memory means; and an entire control means for controlling each component of the digital television broadcast signal receiver, and wherein when the multi-directional antenna is connected to the tuner, the control signal output means outputs control signals at a predetermined interval for switching the effective signal receiving direction of the multi-directional antenna serially to one of a plurality of the signal receiving directions;

the television broadcast signal receiving means receives a digital television broadcast signal of each receivable channel in each signal receiving directions of the multi-directional antenna at the predetermined interval;

the digital signal processing means performs a predetermined signal processing to the digital television broadcast signal of each channel in each signal receiving direction, obtains data of sensitivity of each digital television broadcast signal, and memorizes the data of sensitivity into the memory means;

the signal receiving direction deciding means compares each data of sensitivity memorized in the memory means with a predetermined threshold value;

when there is only one data of sensitivity of each channel equal to larger than the threshold value, the signal receiving direction deciding means sets a signal receiving direction showing the only one data of sensitivity as a primary optimum signal receiving direction of each channel;

when there are two data of sensitivities of each channel equal to larger than the threshold value, the signal receiving direction deciding means sets a signal receiving direction showing a larger data of sensitivity as a primary optimum signal receiving direction of each channel and another signal receiving direction showing another data of sensitivity as a second optimum signal receiving direction of each channel;

when there are more than three data of sensitivities of each channel equal to larger than the threshold value, the signal receiving direction deciding means sets a signal receiving direction showing a largest data of sensitivity as a primary optimum signal receiving direction of each channel, another signal receiving direction showing a secondly larger data of sensitivity as a second optimum signal receiving direction of each channel, and still another signal receiving direction showing a thirdly larger data of sensitivity as a third optimum signal receiving direction of each channel;

the memory means memorizes at least one optimum signal receiving direction of each channel set by the signal receiving direction deciding means;

when an optional channel is chosen by a user, the control signal output means reads out the primary optimum signal receiving direction of the optional channel from the memory means, and outputs a control signal to the multi-directional antenna for switching the effective signal receiving direction of the antenna to the primary optimum signal receiving direction of the optional channel;

the television broadcast signal receiving means receives a television broadcast signal of the optional channel in the primary optimum signal receiving direction;

the signal receiving direction deciding means compares sensitivity of the television broadcast signal of the optional channel with a predetermined threshold value, and judges whether the sensitivity of the television broadcast signal of the optional channel is equal to or larger than the predetermined threshold value or not;

when the sensitivity of the television broadcast signal of the optional channel in the primary optimum signal receiving direction is not equal to or larger than the predetermined threshold value, the control signal output means reads out the second optimum signal receiving direction of the optional channel from the memory means, and outputs a control signal to the multi-directional antenna for switching the effective signal receiving direction of the antenna to the second optimum signal receiving direction of the optional channel;

the television broadcast signal receiving means receives a television broadcast signal of the optional channel in the second optimum signal receiving direction;

the signal receiving direction deciding means compares sensitivity of the television broadcast signal of the optional channel with the predetermined threshold value, and judges whether the sensitivity of the television broadcast signal of the optional channel is equal to or larger than the predetermined threshold value or not;

when the sensitivity of the television broadcast signal of the optional channel in the second optimum signal receiving direction is not equal to or larger than the predetermined threshold value, the control signal output means reads out the third optimum signal receiving direction of the optional channel from the memory means, and outputs a control signal to the multi-directional antenna for switching the effective signal receiving direction of the antenna to the third optimum signal receiving direction of the optional channel;

the television broadcast signal receiving means receives a television broadcast signal of the optional channel in the third optimum signal receiving direction;

the signal receiving direction deciding means compares sensitivity of the television broadcast signal of the optional channel with the predetermined threshold value, and judges whether the sensitivity of the television broadcast signal of the optional channel is equal to or larger than the predetermined threshold value or not; and when the sensitivity of the television broadcast signal of the optional channel in the third optimum signal receiving direction is not equal to or larger than the predetermined threshold value, the entire control means performs a process for resetting at least one optimum signal receiving direction of the optional channel.

* * * * *